April 19, 1955

A. FRIED ET AL 2,706,421

MACHINING TOOL

Filed April 12, 1951

ARMIN FRIED
JOSEPH W. FRIED
INVENTORS

BY

Hazard & Miller
ATTORNEYS

April 19, 1955    A. FRIED ET AL    2,706,421
MACHINING TOOL

Filed April 12, 1951    2 Sheets-Sheet 2

ARMIN FRIED
JOSEPH W. FRIED
INVENTORS

BY
Hazard & Miller
ATTORNEYS

United States Patent Office 2,706,421
Patented Apr. 19, 1955

2,706,421

MACHINING TOOL

Armin Fried and Joseph W. Fried, Burbank, Calif.

Application April 12, 1951, Serial No. 220,648

12 Claims. (Cl. 77—73.5)

This invention relates to a machining tool designed to simultaneously perform a machining operation on the forward side and on the rearward side of a work piece in which there is a previously formed hole.

In many machining operations the work has a previously formed hole therein which extends therethrough and it is desirable to perform machining operation on both the front and rear faces of the work around the hole. Such machining operations may, for example, be the cutting of a countersink on the forward face of the work piece surrounding the forward end of the hole and the chamfering of the rear face of the work around the rear end of the hole. In other situations the operation at the rear end of the hole may be the mere removing of burrs that are left in the course of forming the hole through the work. Still in further situations it may be desirable to spot face around the hole on both the rear and front faces of the work. The particular operations performed on the forward face of the work and on the rear face of the work around the hole may vary considerably and will be governed by the types of cutters employed.

A primary object of the present invention is to provide a tool which will enable both the operation on the forward face of the work and the operation on the rear face of the work to be performed simultaneously and with the same tool.

Still another object of the invention is to provide a tool of this character which is so designed that it will enable machining operations to be performed around the rear edge of the hole even though the rear face of the work is relatively inaccessible.

Another object of the invention is to provide a tool which is readily adjustable so that on adjustment of the tool it may perform simultaneous operations on the forward and rear faces of work pieces of varying thicknesses.

Still another object of the invention is to provide a tool of this character wherein the depth of cut taken can be adjustably limited and controlled.

With the foregoing and other objects in view, which will be made manifest in the following detailed description and specifically pointed out in the appended claims, reference is had to the accompanying drawings for an illustrative embodiment of the invention, wherein:

Figure 1:
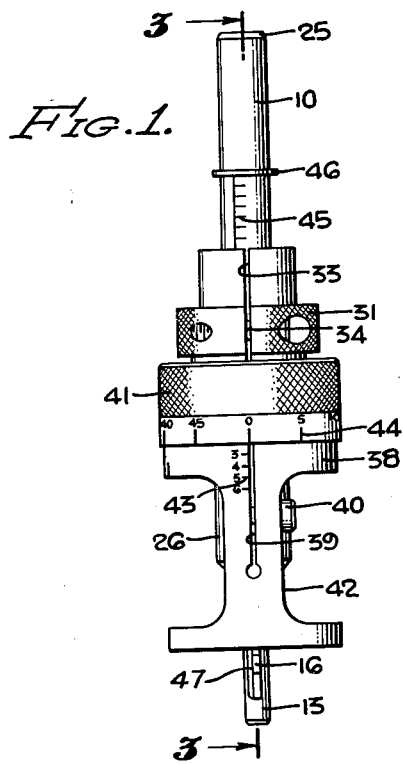
Figure 1 is a view in side elevation of the machining tool embodying the present invention.
Figure 2:
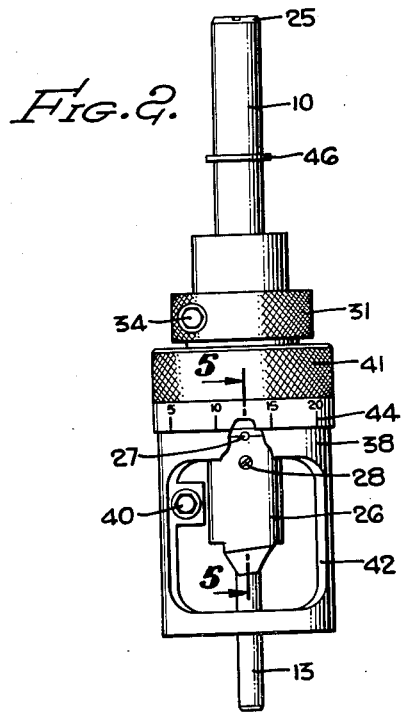
Fig. 2 is another view in side elevation of the tool shown in Fig. 1, taken at ninety degrees from the view as illustrated in Fig. 1.

Referring to the accompanying drawings wherein similar reference characters designate similar parts throughout, the improved tool consists of a hollow spindle 10 that may be clamped in the chuck of a drill press spindle or electric hand drill. This spindle is also susceptible of being mounted in a lathe or other machine tool capable of at least rotating the spindle 10 about its vertical central axis and usually also capable of advancing the spindle toward the work. The latter function, however, is not essential as in some instances the work is advanced toward the tool rather than the tool being advanced toward the work which is the usual situation.

The spindle 10 is hollowed out or drilled out for approximately half of its length, the lower end of the hollow portion terminating at 11. Below the point 11 the spindle is solid except for a slot milled diametrically therein which slot is indicated at 12. The lower end of the spindle is reduced to form a pilot 13 and the slot 12 extends down through a major portion of the length of the pilot.

Figure 3:
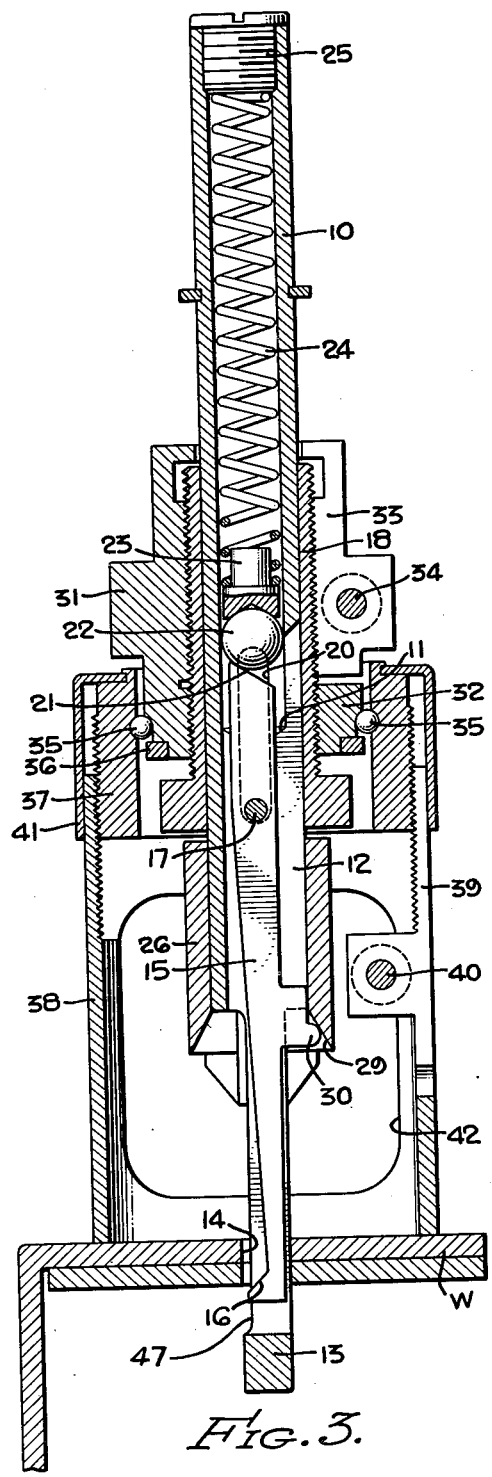
Fig. 3 is a vertical section on an enlarged scale taken substantially upon the line 3—3 upon Fig. 1 and illustrating the tool in that position wherein it has been applied to the work but the cuters of the tool have not been advanced into engagement with the work.

The pilot 13 is of such size that it may readily enter a previously formed hole 14 in the work W. Within the slot 12 there is disposed a lever 15 the lower end of which is shaped as indicated at 16 to provide what will herein be referred to as a rear cutter. This rear cutter is designed to engage and cut the work W adjacent the lower or rear end of the hole 14. The shaping of the cutter 16 will determine the type of machining operation that can be performed around the lower or rear end of the hole 14 and as depicted the cutter 16 is designed to merely bevel or chamfer the work at this point. Other shapes may be given the cutter 16 depending upon the type of operation that it is desired to perform around the bottom of the hole 14. The lever 15 is of such size and shape, particularly adjacent its lower end, that it may assume a position entirely disposed within the outline of the pilot 13, enabling the pilot and the rear cutter 16 to be inserted through the hole 14 as illustrated in Fig. 3.

Figure 5:
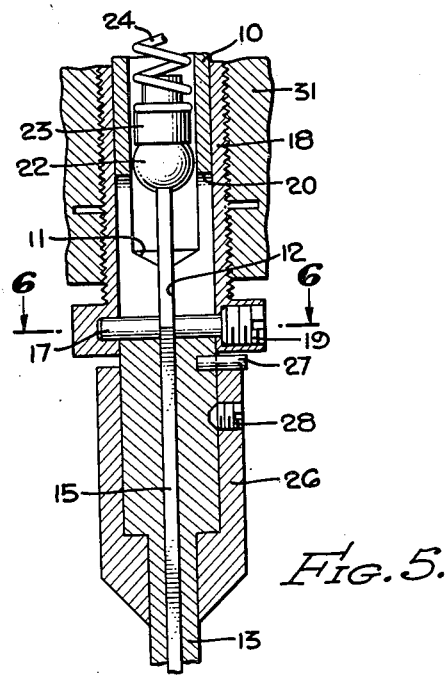
Fig. 5 is a partial view in vertical section taken substantially upon the line 5—5 upon Fig. 2.
Figure 6:
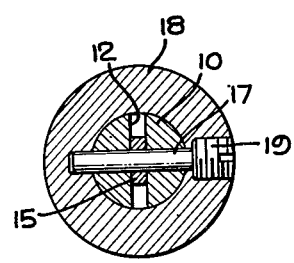
Fig. 6 is a horizontal section taken substantially upon the line 6—6 upon Fig. 5.

The lever 15 is pivotally mounted on a pivot pin 17 that extends diametrically across the spindle 10 and which has its ends disposed in an externally threaded sleeve 18 that is axially slidable on the spindle 10. The pivot pin 17 is retained in position in the sleeve by means of a threaded plug 19 (see Fig. 5) but on removal of this plug the pivot pin may be removed to permit of replacement or substitution of the lever 15 and consequently the substitution of differently shaped rear cutters 16. The pivot pin 17 is vertically slidable between limits in a slot 20 that extends diametrically across the spindle 10. The upper end of the lever 15 is beveled as indicated at 21, and is engaged by a ball 22 that loosely fits within the hollow portion of the spindle 10. This ball is urged downwardly against the bevel 21 by a spring seat 23 which seats a compression spring 24 that is compressed between the spring seat and a plug 25 that is threaded into the top of the spindle. The pressure exerted by the spring 24 causes the ball 22 to urge the lever 15 into its normal or retracted position, that is, the position shown in Fig. 3.

On the lower end of the body of the spindle near the point where it is reduced to form the pilot 13 there is mounted a forward cutter 26. This cutter is tubular in form so as to telescope onto the lower portion of the spindle 10. As depicatd, this cutter is so designed as to form a countersinking cut on the forward face of the work W, although as previously explained this forward cutter may be given various configurations depending on the desired machining operations that it is wished to perform on the forward face of the work W surrounding the upper end of the hole 14.

The cutter 26 is attached to the lower end of the spindle by means of a pin 27 that is mounted in the spindle 10 and which is partially recessed in the top of the cutter. A dog point set screw 28 also extends through the cutter and into a recess in the side of the spindle. The pin 27 and the set screw 28 cooperate to rigidly secure the forward cutter 26 on the spindle but enable this cutter to be removed and replaced whenever desired.

Figure 4:
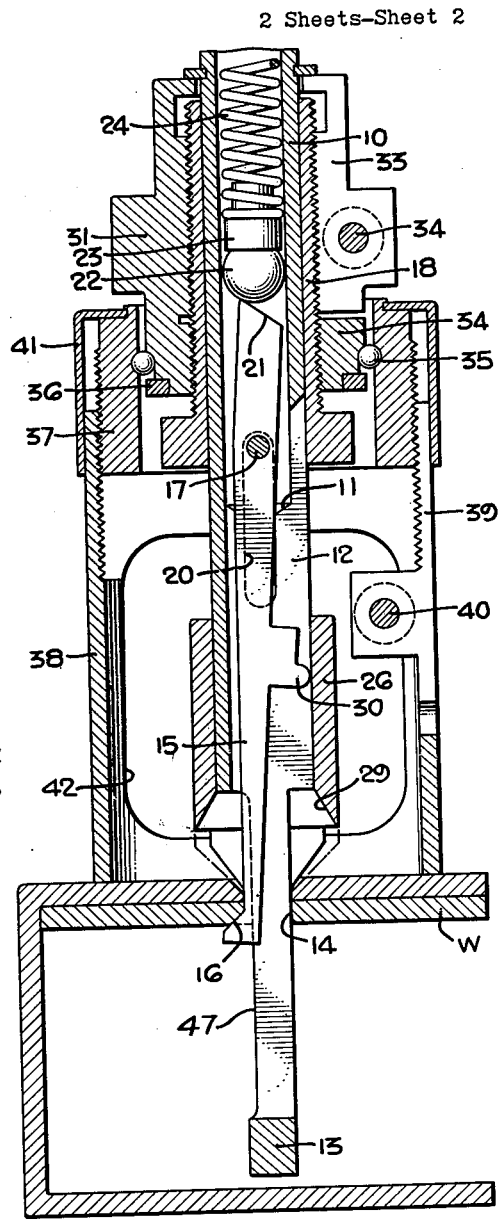
Fig. 4 is a view similar to Fig. 3 but illustrating the positions assumed by the parts when the cutters have been fully advanced.

That portion of the cutter 26 which projects below the bottom of the spindle presents an internal bevel 29 which functions as a cam on the interior of the forward cutter that is engageable by a lobe 30 on the back of the lever 15. The arrangement is such that when the lever 15 and its pivot pin 17 are at the lower end of the slot 20 the lobe 30 will have passed out of the cylindrical portion of the cutter 26 and assumed a position on the cam or bevel 29 as shown in Fig. 3. In this position the rear cutter is disposed entirely within the outline of the pilot. However, as shown in Fig. 4, if the spindle 10 is forced downwardly relatively to the sleeve 18 and with relation to the pivot pin 17, the downwardly moving cutter 26 causes the bevel 29 to cam the lobe 30 and thus project the rear cutter 16 from the position shown in Fig. 3 into the position shown in Fig. 4. When the lobe 30 reaches the cylindrical surface on the interior of cutter 26, the cutter 26 may be moved farther downward without involving any further expansion or projection of the rear cutter. When the spindle 10 is lifted relatively to the work the pressure exerted on the ball 22 by the spring 24 causes the cutter 16 to recede to its normal position within the pilot as soon as this movement is permitted by the lobe 30 encountering the bevel 29.

On the upper end of the sleeve 18 there is threaded an adjusting nut 31. The lower portion of this nut is annular as indicated at 32 but the upper portion thereof is split as indicated at 33. These split portions of the nut are adapted to be tightened together into clamping engagement on the sleeve in any adjusted position by means of a bolt 34 connecting them. The lower portion of the nut 31 provides the inner race for balls 35 of an anti-friction bearing, these balls being retained in position by means of a split ring or equivalent retainer indicated at 36 that is snapped onto the lower portion of the nut. The outer race for this bearing is provided by a collar 37 which is externally threaded to receive a skirt 38. The skirt has its upper end vertically split as at 39 the sides of which can be drawn together by means of a clamping bolt 40 to lock the skirt in any adjusted position relative to the collar 37. A bonnet 41 is mounted on the collar so as to cover and protect the exposed portions of the threads on the collar above the skirt from dirt and foreign matter. This bonnet also serves as a hand grip by which the collar 37 can be held while the skirt 38 is being screwed or threaded relatively thereto in adjusting the skirt for cutting depth. The sides of the skirt are preferably cut away as indicated at 42 to facilitate the feeding of cutting fluids and to permit the user to observe the work and the cutting action performed by the forward cutter. In the preferred form of construction the skirt is graduated as indicated at 43 and, by selecting threads such as 20 threads per inch between the skirt 38 and the collar 37, graduations 44 may be applied circumferentially on the bonnet 41 that is rigidly mounted on the collar so as to accurately indicate in thousandths of an inch the position of the bottom of the skirt. In a similar manner, the spindle 10 may be graduated as at 45, these graduations being associated with the nut 31 and with the rear cutter 16.

On the exterior of the spindle there is an external shoulder which may be provided by a split ring 46. This shoulder or split ring is engageable by the nut 31 and serves to limit downward movement of the spindle 10 relative to the sleeve 18. It is with respect to this limiting position that calibrated positioning of skirt 38 and nut 31 are established to respectively control depth of entry of front cutter 26 and rear cutter 16 into the work.

The operation of the tool above described is substantially as follows. The work W is assumed to have a previously formed hole 14 therein which may be formed such as by drilling, punching or the equivalent. As shown it is desired to countersink the upper end of this hole with a countersinking cutter such as that illustrated at 26 and to bevel the rear or lower end of this hole with a beveling cutter 16. The pilot 13 is lowered into the hole or into the position shown in Fig. 3 wherein the skirt 38 engages the forward face of the work. The skirt consequently holds the collar 37, the bearing 35, and the sleeve 18 against descent. The spindle is then rotated and is forced downwardly toward the work, thus carrying the forward cutter 26 toward the upper surface of the work W. As the cutter 26 descends its bevel 29 cams the lobe 30 inwardly thus causing the rear cutter to be projected from its position within the pilot 13. When the lobe reaches the cylindrical inner surface of the cutter 26, the cutter 26 may thereafter descend with the spindle without involving any further projecting or advancing movement of the cutter 16. Consequently the forward cutter may be advanced towards the work to make the forward cut until limited by the engagement between the nut 31 and the shoulder or split ring 46. The lowering of the spindle and of the forward cutter does not involve a disturbance of the elevation of the rear cutter 16. This cutter is supported at a stationary elevation governed by the pivot pin 17 which, in turn, is supported on the sleeve 18 that is supported through the anti-friction bearing 35 on the skirt 38. When both the forward and the rear cuts are completed the spindle 10 is lifted, drawing the forward cutter 26 upwardly from the work and when the lobe 30 encounters the bevel 29 allowing the rear cutter to return to its position within the pilot 13 under the action of the spring-pressed ball 22. A projecting heel immediately above the lobe 30 acts as a stop limiting retracting movement of the cutter to a position wherein it will lie wholly within the body of the pilot as indicated in Fig. 3. The pilot can then be withdrawn from the work through the hole 14 and the cutting operations on the front and rear of the work are thus completed. As will be observed from Fig. 4, the work may be of such a character that the face at the lower or rear end of the hole 14 is virtually inaccessible from the rear side and the improved tool not only permits of both the forward machining operation and the rear machining operation to take place simultaneously but it enables the machining operation to be performed on an otherwise inaccessible surface.

In setting up the tool for a given piece of work the operator first adjusts for the depth of the front cutter 26 by moving the nut 31 into engagement with the shoulder 46 and then adjusting the skirt 38 relative to the collar 37. After completing the adjustment of the skirt while in this position he then adjusts the nut 31 relatively to the sleeve 18. This latter adjustment merely shifts the sleeve 18 upwardly or downwardly to properly position the rear cutter without affecting or disturbing the adjustment previously made for the front cutter as the distance between the bottom of the skirt and the top of the nut 31 which is engaged by the shoulder 46 is not altered thereby.

From the above described construction it will be appreciated that the improved tool is highly advantageous in that it permits machining operations to be simultaneously performed with a single setup at both the forward and the rear end of a previously formed hole in the work. When the work is completed the tool may be bodily withdrawn from the work from the forward side thereof. The parts of the tool are relatively simple and can be easily manufactured and assembled together and the design is such that the parts may be ruggedly made so that the tool can withstand considerable abuse. As the skirt 38, the bonnet 41, and the collar 37 are mounted on the nut 31 by means of an anti-friction bearing 35, there is no tendency for the skirt to rotate sympathetically with the spindle 10 and thus mar or deface the forward face of the work.

It will, of course, be appreciated that the types of cutters employed will be properly ground or shaped to perform their intended cutting operations. If the rear cutter is intended or designed to cut internal recesses, that is, to perform operations intermediate the ends of the hole instead of at the rear end thereof, a chip throat 47 may be formed in the surface of the pilot adjacent the rear cutter to accommodate such chips or cuttings that are cut thereby.

It is possible to use the new tool without the performance of any machining operation on the forward face of the work. When this is desired, a tubular sleeve presenting no cutting edges is substituted for the front cutter 26 in order to provide the required cam or bevel 29 for the load 30. This tubular sleeve performs no important function when such a substitution is made other than to cam the rear cutter 16 outwardly and to stop or limit its retracting movement. When such a tubular sleeve is substituted an advantage is gained by the tool for performing machining operations on the rear face of the work only. Any cutting tool operating on the under surface of the work will normally tend to lift the workpiece from its support such as a supporting drill press table. To counteract this, supplementary means such as clamps, etc. are used to fasten the workpiece rigidly on the drill press table to resist such upward thrust. In the improved tool no supplementary holddown means is required at any time inasmuch as the outer skirt 38 comes into direct contact with the top of the work and hold it firmly against the drill press table or similar support. Under the action of the compression spring 24 the workpiece is held in contact with the drill press table or other support and the forces exerted by the rear cutter 16 tending to lift the work are opposed or counteracted by the forces exerted within the tool itself and which are effective on the forward or upper surface of the work.

Various changes may be made in the details of the construction without departing from the spirit and scope of the invention as defined by the appended claims.

We claim:

1. A device of the class described comprising a spindle and pilot, a sleeve slidable thereon, a nut threaded on the sleeve, a collar surrounding a portion of the nut, an anti-friction bearing between the nut and the collar, a work-engaging skirt threaded onto the collar, a front cutter on the spindle within the skirt, a rear cutter disposed within the spindle and pilot, means pivotally mounting the rear cutter on the sleeve enabling the spindle to slide relatively thereto, and means operable by the axial movement of the spindle relative to the sleeve for swinging the rear cutter laterally with respect to the spindle and pilot.

2. A device of the class described comprising a spindle and pilot, a sleeve slidable thereon, a nut threaded on the sleeve, a collar surrounding a portion of the nut, an anti-friction bearing between the nut and the collar, a work-engaging skirt threaded onto the collar, a front cutter on the spindle within the skirt, a rear cutter disposed within the spindle and pilot, means pivotally mounting the rear cutter on the sleeve enabling the spindle to slide relatively thereto, means operable by the axial movement of the spindle relative to the sleeve for swinging the rear cutter laterally with respect to the spindle and pilot, and spring means urging the cutters into retracted positions.

3. A device of the class described comprising a spindle and pilot, a sleeve slidable thereon, a nut threaded on the sleeve, a collar surrounding a portion of the nut, an anti-friction bearing between the nut and the collar, a work-engaging skirt threaded onto the collar, a front cutter on the spindle within the skirt, a rear cutter disposed within the spindle and pilot, means pivotally mounting the rear cutter on the sleeve enabling the spindle to slide relatively thereto, means operable by the axial movement of the spindle relative to the sleeve for swinging the rear cutter laterally with respect to the spindle and pilot, said spindle being hollow, and spring means disposed therein operable upon the rear cutter to urge the rear cutter into retracted position and urging the spindle into a position retracting the front cutter.

4. A device of the class described comprising a spindle and pilot, a sleeve slidable thereon, a nut threaded on the sleeve, a collar surrounding a portion of the nut, an anti-friction bearing between the nut and the collar, a work-engaging skirt threaded onto the collar, a front cutter on the spindle within the skirt, a rear cutter disposed within the spindle and pilot, means pivotally mounting the rear cutter on the sleeve enabling the spindle to slide relatively thereto, means operable by the axial movement of the spindle relative to the sleeve for swingnig the rear cutter laterally with respect to the spindle and pilot, and a shoulder on the spindle engageable by the nut for limiting advancing movement of the spindle and front cutter.

5. A device of the class described comprising a spindle and pilot, a sleeve slidable thereon, a nut threaded on the sleeve, a collar surrounding a portion of the nut, an anti-friction bearing between the nut and the collar, a work-engaging skirt threaded onto the collar, a front cutter on the spindle within the skirt, a rear cutter disposed within the spindle and pilot, means pivotally mounting the rear cutter on the sleeve enabling the spindle to slide relatively thereto, and cam means on the front cutter operable to project the rear cutter from the spindle and pilot as the front cutter is advanced towards the work.

6. A device of the class described comprising a spindle and pilot, a sleeve slidable thereon, a nut adjustable relatively to the sleeve, a collar surrounding a portion of the nut, an anti-friction bearing between the nut and the collar, a work-engaging skirt adjustable on the collar, a front cutter on the spindle within the skirt, a rear cutter disposed within the pilot, means pivotally mounting the rear cutter on the sleeve enabling the spindle to slide relatively thereto, and means operable by the axial movement of the spindle relative to the sleeve for swinging the rear cutter laterally with respect to the pilot.

7. A device of the class described comprising a spindle and pilot, a sleeve slidable thereon, a nut adjustable relatively to the sleeve, a collar surrounding a portion of the nut, an anti-friction bearing between the nut and the collar, a work-engaging skirt adjustable on the collar, a front cutter on the spindle within the skirt, a rear cutter disposed within the pilot, means pivotally mounting the rear cutter on the sleeve enabling the spindle to slide relatively thereto, means operable by the axial movement of the spindle relative to the sleeve for swinging the rear cutter laterally with respect to the pilot, and a shoulder on the spindle engageable with the nut to limit movement of the spindle relatively to the sleeve.

8. A device of the class described comprising a spindle and pilot, a sleeve slidable thereon, a nut adjustable relatively to the sleeve, a collar surrounding a portion of the nut, an anti-friction bearing between the nut and the collar, a work-engaging skirt adjustable on the collar, a front cutter on the spindle within the skirt, a rear cutter disposed within the pilot, means pivotally mounting the rear cutter on the sleeve enabling the spindle to slide relatively thereto, means operable by the axial movement of the spindle relative to the sleeve for swinging the rear cutter laterally with respect to the pilot, and spring means disposed within the spindle urging the rear cutter to swing about its pivot into retracted position within the pilot and urging the spindle into its retracted position with respect to the pivot for the rear cutter.

9. A device of the class described comprising a rotary spindle, a sleeve about the spindle, a rear cutter disposed in the spindle, a pivot pin pivotally connecting the rear cutter to the sleeve and extending through longitudinal extending slots in the spindle whereby the spindle is permitted a limited axial movement with respect to the sleeve and the rear cutter may swing laterally relative to the sleeve and spindle, a front cutter on the spindle, cam means between the rear cutter and the spindle for causing the rear cutter to swing laterally relative to the spindle when the spindle is moved axially relatively thereto to advance the front cutter to the work, and means for adjustably supporting the sleeve in spaced relation to the work.

10. A device of the class described comprising a rotary spindle, a sleeve about the spindle, a rear cutter disposed in the spindle, a pivot pin pivotally connecting the rear cutter to the sleeve and extending through longitudinally extending slots in the spindle whereby the spindle is permitted a limited axial movement with respect to the sleeve and the rear cutter may swing laterally relative to the sleeve and spindle, a front cutter on the spindle, cam means between the rear cutter and the spindle for causing the rear cutter to swing laterally relative to the spindle when the spindle is moved axially relatively thereto to advance the front cutter to the work, a nut threaded on the sleeve, an anti-friction bearing on the nut, a work-engaging skirt adjustably mounted on the anti-friction bearing, and a stop on the spindle engageable with the nut whereby advancement of the spindle and front cutter carried thereby is adjustably limited by engagement between the stop and the nut, and the position of the rear cutter is governed by the position of the nut on the sleeve and the adjustment of the skirt relative to the anti-friction bearing.

11. A device of the class described comprising a rotary spindle, a sleeve about the spindle, a rear cutter disposed in the spindle, a pivot pin pivotally connecting the rear cutter to the sleeve and extending through longitudinally extending slots in the spindle whereby the spindle is permitted a limited axial movement with respect to the sleeve and the rear cutter may swing laterally relative to the sleeve and spindle, a front cutter on the spindle, cam means between the rear cutter and the spindle for causing the rear cutter to swing laterally relative to the spindle when the spindle is moved axially relatively thereto to advance the front cutter to the work, a nut threaded on the sleeve, an anti-friction bearing on the nut, a work-engaging skirt adjustably mounted on the anti-friction bearing, and a stop on the spindle engageable with the nut whereby advancement of the spindle and front cutter carried thereby is adjustably limited by engagement between the stop and the nut, and the position of the rear cutter is governed by the position of the nut on the sleeve and the adjustment of the skirt relative to the anti-friction bearing, and spring means between the spindle and the rear cutter urging the spindle into retracted position relative to the skirt and urging the rear cutter into retracted position with respect to the spindle.

12. A device of the class described comprising a longitudinally slotted rotary spindle, a front cutter carried thereby, a sleeve about the spindle, means for supporting the sleeve in fixed relation to the work, a rear cutter in the slot of the spindle, a pivot pin pivotally connecting the rear cutter to the sleeve and extending through longitudinal slots in the spindle whereby the spindle may move axially to advance the front cutter against the work without disturbing the position of the rear cutter in an axial direction, and cam means between the spindle and the rear cutter for causing the rear cutter to swing laterally relatively to the spindle and sleeve as the spindle is advanced toward the work.

References Cited in the file of this patent

UNITED STATES PATENTS

| | | |
|---|---|---|
| 1,530,593 | Calkins | Mar. 24, 1925 |
| 2,115,319 | Roye | Apr. 26, 1938 |